(12) United States Patent
Brandmeier et al.

(10) Patent No.: US 10,620,023 B2
(45) Date of Patent: Apr. 14, 2020

(54) METHOD FOR DETERMINING A MASS FLOW COMPOSED OF BULK MATERIAL

(71) Applicant: CLAAS Selbstfahrende Erntemaschinen GmbH, Harsewinkel (DE)

(72) Inventors: Jonas Brandmeier, Harsewinkel (DE); Gunnar Quincke, Soest (DE); Martin Kubbeler, Versmold (DE); Sebastian Neu, Bad Laer (DE); Markus Brune, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 226 days.

(21) Appl. No.: 15/718,372

(22) Filed: Sep. 28, 2017

(65) Prior Publication Data

US 2018/0087939 A1 Mar. 29, 2018

(30) Foreign Application Priority Data

Sep. 29, 2016 (DE) .......................... 10 2016 118 559

(51) Int. Cl.
*G01F 1/20* (2006.01)
*A01D 41/127* (2006.01)
*G01F 1/30* (2006.01)

(52) U.S. Cl.
CPC .......... *G01F 1/206* (2013.01); *A01D 41/1271* (2013.01); *A01D 41/1272* (2013.01); *G01F 1/30* (2013.01)

(58) Field of Classification Search
CPC .......... G01F 1/206; G01F 3/04; G01F 13/001; G01F 13/003; A01D 41/1271; A01D 41/1272
See application file for complete search history.

(56) References Cited

U.S. PATENT DOCUMENTS

| 5,343,761 A * | 9/1994 | Myers ................. A01C 7/105 73/861 |
| 9,645,006 B2 * | 5/2017 | Phelan ............... G01F 25/0046 |
| 2018/0042177 A1 * | 2/2018 | Baert ................. A01D 41/1272 |

FOREIGN PATENT DOCUMENTS

| EP | 0853234 A1 | 7/1998 |
| EP | 1169905 A1 | 1/2002 |
| GB | 2321112 A | 7/1998 |

OTHER PUBLICATIONS

European Search Report for European Patent No. 17001099, dated Feb. 13, 2018 (9 pages).

* cited by examiner

*Primary Examiner* — Justin N Olamit
(74) *Attorney, Agent, or Firm* — Lempia Summerfield Katz LLC

(57) ABSTRACT

A method for determining a mass flow composed of bulk material, in particular grain, which is conveyed by means of a continuous, circulating conveyor, having planar conveyor elements, from a lower bulk material receiving area to a higher bulk material delivery area, in which the bulk material delivered by the conveyor is deflected by a guide surface disposed in the bulk material delivery area toward a measuring device, wherein the mass flow is determined by the measurement of a resulting force ($F\_G$) exerted on a sensor surface of the measuring device, wherein at least two parameters having an effect on the force measurement, in particular parameters independent of bulk material properties, are compensated for. A control and regulating device for executing the method for determining a mass flow composed of bulk material is also provided.

15 Claims, 4 Drawing Sheets

METHOD FOR DETERMINING A MASS FLOW COMPOSED OF BULK MATERIAL

CROSS REFERENCE TO RELATED APPLICATIONS

This application claims priority to German Patent Application No. DE 102016118559.0, filed Sep. 29, 2016, the entire disclosure of which is hereby incorporated herein by reference.

FIELD OF THE INVENTION

The present disclosure relates to a method for determining a mass flow composed of bulk material, as well as a control and regulating device for a self-driving harvester.

BACKGROUND

In order to determine a mass flow composed of bulk material, in particular grain, which is conveyed by means of a continuous, circulating conveyor, having planar conveyor elements, from a lower bulk material receiving area to a higher bulk material delivery area, in which the bulk material delivered by the conveyor is redirected by a guide surface disposed in the bulk material delivery area toward a measuring device, it is known to determine the mass flow through the measurement of a force exerted on a sensor surface of the measuring device.

A method of the type specified above is known from EP 1 169 905 A1. EP 1 169 905 A1 describes a conveyor having a continuous, circulating conveyor chain, on which conveyor paddles are disposed. The conveyor paddles throw the bulk material located thereon in the redirection point toward a housing enclosing the conveyor in the bulk material delivery area. The bulk material flows along the inner surface of the housing and is deflected toward a sensor surface of a measuring device. The measuring device is configured to measure the centrifugal force applied to the sensor surface by the mass flow. It is possible to derive the mass flow from the measurement of the centrifugal force. The method known from EP 1 169 905 A1 takes the particle size of the bulk material into account in the determination of the mass flow. With the delivery of the bulk material from the conveyor paddles by the throwing thereof toward the sensor surface, different speeds are reached that are dependent on the particle sizes.

SUMMARY

A method, as well as a control and regulating device for executing a method for determining a mass flow, provide an improvement in the precision of the throughput determination.

In one embodiment, a method is proposed for determining a mass flow composed of bulk material, in particular grain. Bulk material is conveyed by means of a continuous, circulating conveyor, having planar conveyor elements, from a lower bulk material receiving area to a higher bulk material delivery area, in which the bulk material delivered by the conveyor is deflected by a guide surface disposed in the bulk material delivery area toward a measuring device. The mass flow is determined by the measurement of a resulting centrifugal force exerted on a sensor surface of the measuring device. In order to improve the precision of the throughput determination, at least two parameters that have an effect on the force measurement, in particular parameters that are independent of bulk material properties, are compensated for. A first parameter, which is compensated for in the determination of the mass flow with respect to the throughput conveyed by the conveyor, are the frictional forces imposed on the sensor surface by the bulk material as it flows past. Aside from this first parameter that has an effect on the force measurement, at least one second parameter is provided for, that is to be taken into account, which can have an effect on the measurement results of the force measurement. This is a parameter that represents external effects, which have a permanent, or only a temporary, effect on the measurement with respect to the forces applied to the sensor surface by the bulk material flowing over the sensor surface.

Frictional forces transferred to the sensor surface by the bulk material can preferably be compensated for by an appropriate design of the measuring device, in which a resulting frictional force acts in a direction perpendicular to the measuring device. The sensor surface is tangential thereby to the parabolic course of the conveyed material flow, and the resulting friction contributes axially to the measurement of the measuring device, such that this force is not measured. For this, the measuring device can include a load cell designed as a platform weighing cell.

Furthermore, a tilting of the measuring device can be detected and compensated for. A transverse and/or longitudinal tilting may occur during the harvesting by the harvester due to ground conditions. This tilting has an effect on the resulting centrifugal force measured by the measuring device. The measurement of the resulting centrifugal force acting on the sensor surface only fully takes place when this force acts precisely in the measurement direction of the measuring device, i.e. the load cell. If the tilt of the measuring device, or the harvester, respectively, changes, gravity acts at a different angle on the sensor surface and the mass flow. The change in the resulting centrifugal force and the force measured by the load cell under the effect of the detected tilt of the harvester is offset accordingly, and thus compensated for in the determination of the throughput or yield.

Moreover, external mechanical forces acting substantially vertically on the conveyor can be compensated for. These include acceleration forces, which are transferred to the measuring device by the harvester when it drives over a field, as well as by drives of the harvester, in the form of oscillations. These acceleration forces act on the measuring device such that there are deviations in the forces measured by the load cell at the time when the acceleration occurs. Thus, driving through a depression in the ground may lead to an abrupt acceleration, substantially in the vertical direction, which has an effect on the measurement of the centrifugal force exerted by the harvest on the sensor surface. Moreover, other aspects of the driving dynamics, e.g. an acceleration or deceleration of the harvester have an effect on the measuring device. The same applies to oscillations or vibrations caused by the drives of the harvester, which are transferred by the vehicle body or drive elements. These additional forces caused by acceleration can likewise be compensated for.

Furthermore, a reduction in the rotational rate of the conveyor can be compensated for. A temporary reduction in power from the drive of the harvester results in a reduction in the rotational rate of the conveyor. In order to determine that a power reduction has occurred, the rotational rate is monitored. In addition to the drive rotational rate of the drive of the harvester, the rotational rate of the conveyor can also be monitored with sensors thereby. The temporary reduction in the rotational rate of the drive results in a reduction in the rotational rate, or a reduction in the conveyance speed of the continuous, circulating conveyor. The accompanying reduction in speed of the bulk material flow flowing along the sensor surface, indicating a reduction of the resulting centrifugal force exerted by the bulk material flow on the sensor surface, is offset accordingly. The resulting centrifugal force exerted by the bulk material flow on the sensor surface is determined in this manner, taking into account the speed reduction during the force measurement by the measuring device in order to determine the throughput.

It is advantageous that, for a calibration of the measuring device, the bulk material is weighed multiple times, and a correction factor is determined from the results. The calibration of the measuring device can be carried out once and remains valid for the entire service life of the harvester. However, the calibration is preferably carried out at the start of each harvest season.

The moisture content of the bulk material can preferably be determined. The moisture content of the bulk material is a further parameter that has an effect on the determination of the mass flow on the basis of the force measurements by the measuring device. The overall weight of the individual bulk material particles can increase when the moisture content increases. An increasing moisture content of the harvest can have an effect on the flow speed at which the harvest flows along the sensor surface. In addition, the moisture can have an effect, on one hand, on the adhesion between the bulk material and the sensor surface, and on the other hand, between individual particles of the bulk material. As a result, the centrifugal force exerted by the bulk material passing over the sensor surface can vary while the throughput remains constant. In order to compensate for this effect, the detection characteristic of the measuring device can be modified as a function of the moisture content of the bulk material.

Furthermore, the type of bulk material should also be taken into account. The type and nature of the bulk material have an effect on the measurement as a rule. The size and weight of the individual particles of the bulk material determine the discharge behavior when leaving the conveyor elements of the conveyor in their redirection point in the bulk material delivery area.

In particular, the measurement characteristics of the measuring device can be adjusted, depending on the type of material and its physical properties.

The determination of the mass flow is carried out independently of the density.

In one embodiment, a control and regulating device is proposed for executing a method for determining a mass flow composed of bulk material, for example one of the embodiments disclosed herein, which is conveyed by a self-driving harvester, in particular a combine harvester, by means of a continuous, circulating conveyor, having planar conveyor elements, from a lower bulk material receiving area to a higher bulk material delivery area, in which the bulk material delivered by the conveyor can be redirected toward a measuring device by a guide surface disposed in the bulk material delivery area, wherein the mass flow is determined by the measurement of a force exerted on a sensor surface of the measuring device, wherein the control and regulating device is configured to compensate for at least two parameters, in particular parameters independent of bulk material properties, which have an effect on the force measurement executed by the measuring device.

For this, the control and regulating device can be connected to at least one sensor in a signal transmitting manner, which serves to detect at least one of the parameters having an effect on the force measurement.

The at least one sensor can thus be configured as an acceleration sensor.

Moreover, the at least one sensor can be configured as a tilt sensor.

Furthermore, the at least one sensor can be configured as a rotational rate sensor.

In particular, the control and regulating device can comprise a memory unit, in which various detection characteristics of the measuring device are stored, which can be selected, depending on a harvest parameter, in particular the type of harvest and/or the moisture content of the harvest. An editable grain type table that can be stored in the control and regulating device can be referenced for this. These detection characteristics can also be stored as characteristic curves in the control and regulating device.

BRIEF DESCRIPTION OF THE DRAWINGS

The present invention shall be explained in greater detail below, based on exemplary embodiments depicted in the drawings.

Therein.

DETAILED DESCRIPTION

Figure 1:
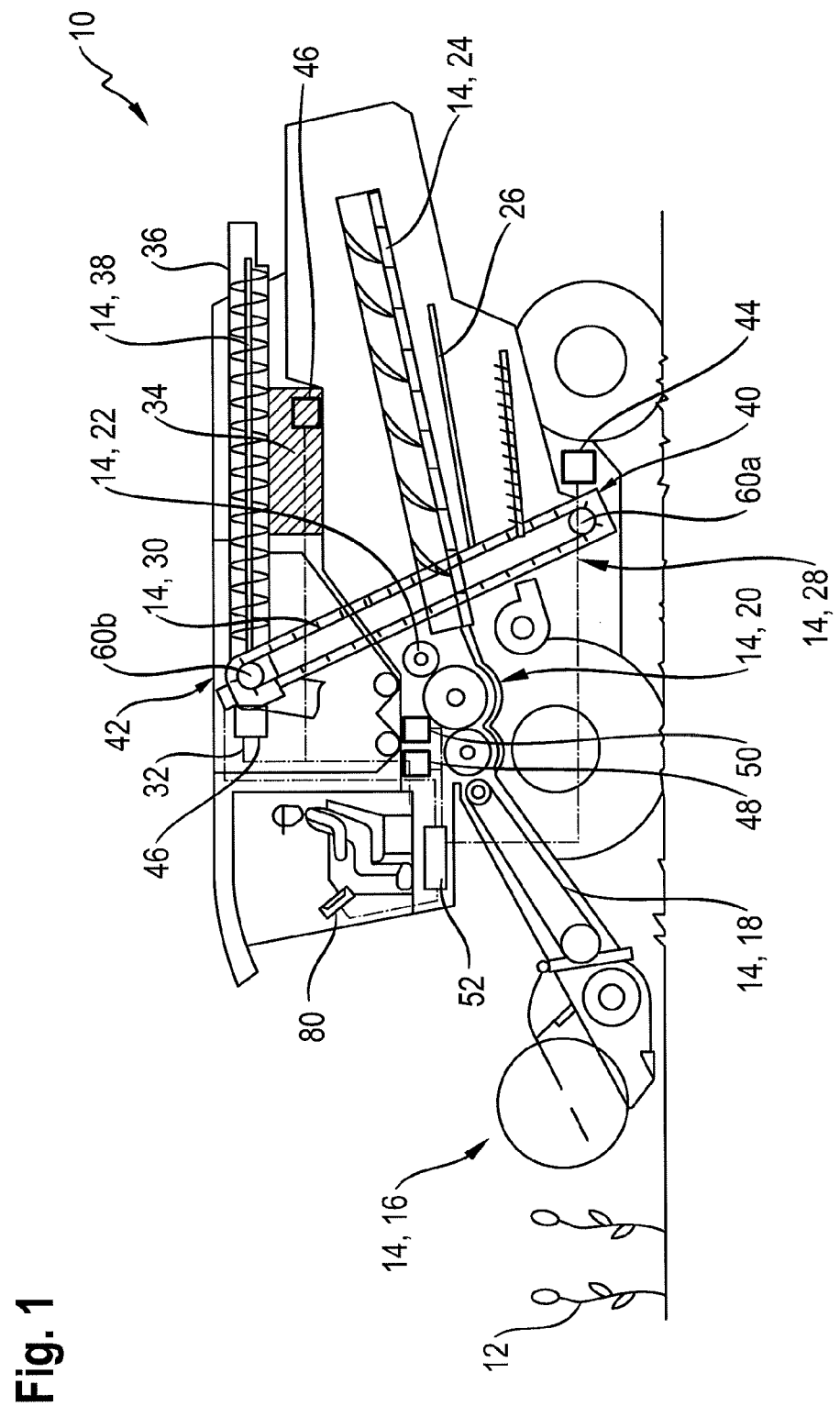
FIG. 1 shows a schematic side view of a combine harvester.

An agricultural harvester is depicted in FIG. 1, which is a self-driving combine harvester 10. The combine harvester 10 has numerous working assemblies 14 for receiving and processing harvest 12. In the depicted combine harvester 10, the working assemblies 14 include a cutting unit 16 for receiving the harvest 12 and a grain conveyor 18 for further transport of the harvest 12 in the combine harvester. From the grain conveyor 18, the harvest 12 is transferred as a harvest flow to a further working assembly 14 in the form of a thresher 20 of the combine harvester 10. The harvest flow is then transported via an impellor 22 to a separator 24 in the form of a separating rotor in order to remove loose grain in the harvest flow into a lower region of the combine harvester. From there, the harvest flow is conveyed via a return pan 26 to a cleansing device 28, which comprises sieves and a fan for cleansing the harvest. The loose grain from the harvest flow is transported by a conveyor 30 configured as a chain conveyor to a grain tank 32. For this, the conveyor 30 receives the cleansed harvest in a lower bulk material receiving area 40 in the lower region of the conveyor 30 and conveys it to a higher bulk material delivery area 42 in the upper region of the conveyor 30. The combine harvester 10 also has an engine 34, which provides the drive power necessary for operating the working assemblies 14 and for driving the combine harvester 10, e.g. by means of a hydrostatic drive (not shown). The working assemblies 14 and the traction drive of the combine harvester 10 are connected to the engine 34 such that power can be transferred thereto for these purposes.

Furthermore, the combine harvester 10 comprises a control and regulating device 52, which is connected to an input/output device 80 in the interior of the cab of the combine harvester 10 for the transmission of signals. Moreover, the control and regulating device 52 is connected to numerous sensors installed in the combine harvester 10, which determine operating and harvest parameters. The sensors installed on or in the combine harvester 10 include, among others, a moisture sensor 44 for determining the moisture content of the, in particular, cleansed harvest, at least one rotational rate sensor 46 for monitoring the drive speed of the engine 34, a tilt sensor 50, and at least one acceleration sensor 48, which determines accelerations acting on the combine harvester 10 caused by driving on a field or result from the engine 34 and other components of the combine harvester 10 that convey the drive forces. The configuration of further sensors that record operating or harvest parameters, which can influence in particular a throughput measurement of the cleansed harvest in the conveyor, is conceivable.

Figure 2:
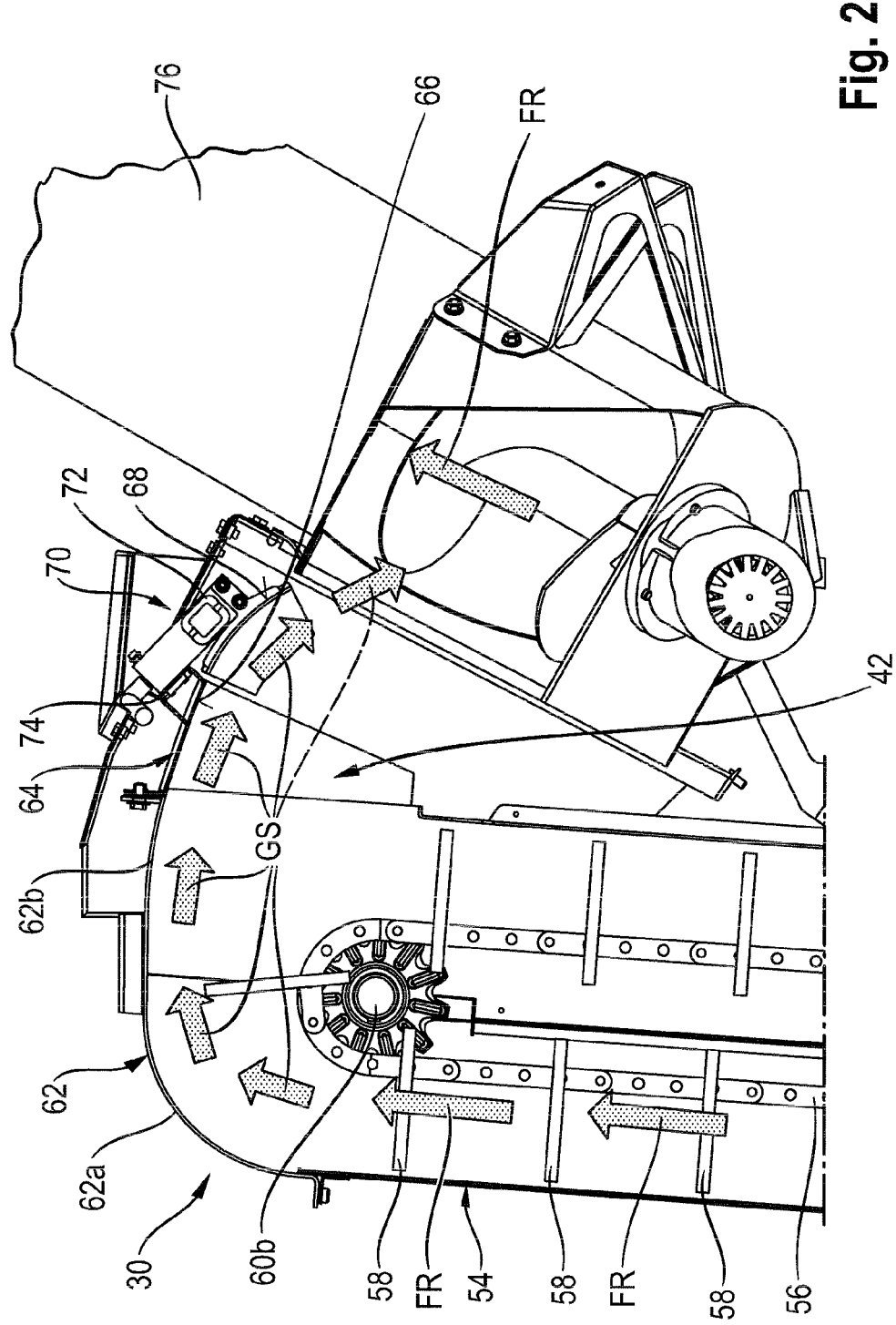
FIG. 2 shows a partial view of a conveyor for the combine harvester, configured as a chain conveyor.

A partial view of the conveyor 30 for the combine harvester 10, designed as a chain conveyor, is depicted in FIG. 2. The conveyor 30 comprises a housing 54, which substantially encloses a continuous, circulating conveyor chain 56, which is driven and redirected about respective lower and upper chain or drive wheels 60a, 60b disposed in the bulk material receiving area 40 and in the bulk material delivery area 42. The housing 54 has openings in both the bulk material receiving area 40 and the bulk material delivery area 42, through which the harvest is fed in and discharged. Planar conveyor elements 58 are disposed at uniform spacings on the continuous circulating conveyor chain 56. The paddle-shaped conveyor elements 58 extend substantially perpendicular to the conveyor chain 56. The direction of conveyance and circulation of the conveyor 30 is indicated by arrows FR. Thus, at least one sensor 46 can be dedicated to the conveyor 30, which monitors the conveyance speed of the conveyor 30. This sensor can be configured as a rotational rate sensor 46, which monitors the rotational rate of a chain wheel 60a, 60b. Alternatively, an optical sensor may be provided, which measures the lateral spacings of the passing conveyor elements 58.

In the bulk material delivery area 42, the upper chain wheel 60b is partially enclosed by a single- or multi-piece cover section 62. The cover section 62 has a first section 62a with a substantially circular section-shaped cross section, which partially encompasses the upper chain wheel 60b in the radial direction. On the side facing the bulk material delivery area 42, the cover section 62 has a second section with a substantially rectangular cross section. The second section 62b has a smaller curvature radius than the first section 62a of the cover section 62 thereby.

A guide section 64 adjoins the cover section 62. The guide section 64 is a separate component. A transition 78 between the cover section 62 and the guide section 64 facing the upper chain wheel 60b has a tangential course in the direction of the circumference. The configuration of the guide section 64 on the cover section 62 is substantially without steps, such that a tangential transition is formed. The conveyor elements 58 that are substantially horizontal prior to reaching the upper chain wheel 60b first transport the harvest from a lower bulk material receiving area 40 to a higher bulk material delivery area 42. Through the redirection of the conveyor elements 58 about the upper chain wheel 60b, the harvest lying on the planar conveyor elements 58 is released in the radial direction of the cover section 64. The flight path of the harvest thrown off by the conveyor elements 58 is delimited in the radial direction by the inner surface of the cover section 62 facing the chain wheel 60b. The arrows GS illustrate the course of the flow of the bulk material or harvest flow moving along the cover section 62, the guide section 64, and a sensor surface 68.

A measuring device 70 is disposed on the guide section 64. A mount 74 is provided for this on the outside of the guide section 64. A load cell 72 is attached to the mount 74. The sensor surface 68 is disposed on the load cell 72, which has a curved shape corresponding to the flow course GS. The load cell 72 and the sensor surface 68 are components of the measuring device 70. The guide section 64 has a guide surface 66, which faces the upper chain wheel 60b. A further transition 78 between the guide surface 66 of the guide section 64 and the sensor surface 68 of the measuring device 70 likewise has a tangential course. The sensor surface 68 of the measuring device 70 is disposed in the upper region of the conveyor 30, such that there is a tangential course in the transition 78 from the guide surface 66 to the sensor surface 68. The measuring device 70 is positioned thereby in the discharge area of the conveyor 30, i.e. after the harvest has entirely left the paddle-shaped conveyor elements 58. The sensor surface 68 has an abrasion-resistant, durable surface, which is distinguished by the surface roughness.

The harvest leaving the conveyor 30 in the bulk material delivery area 42 is conveyed to a grain auger 76, which conveys the harvest into the grain tank 32.

Figure 3:
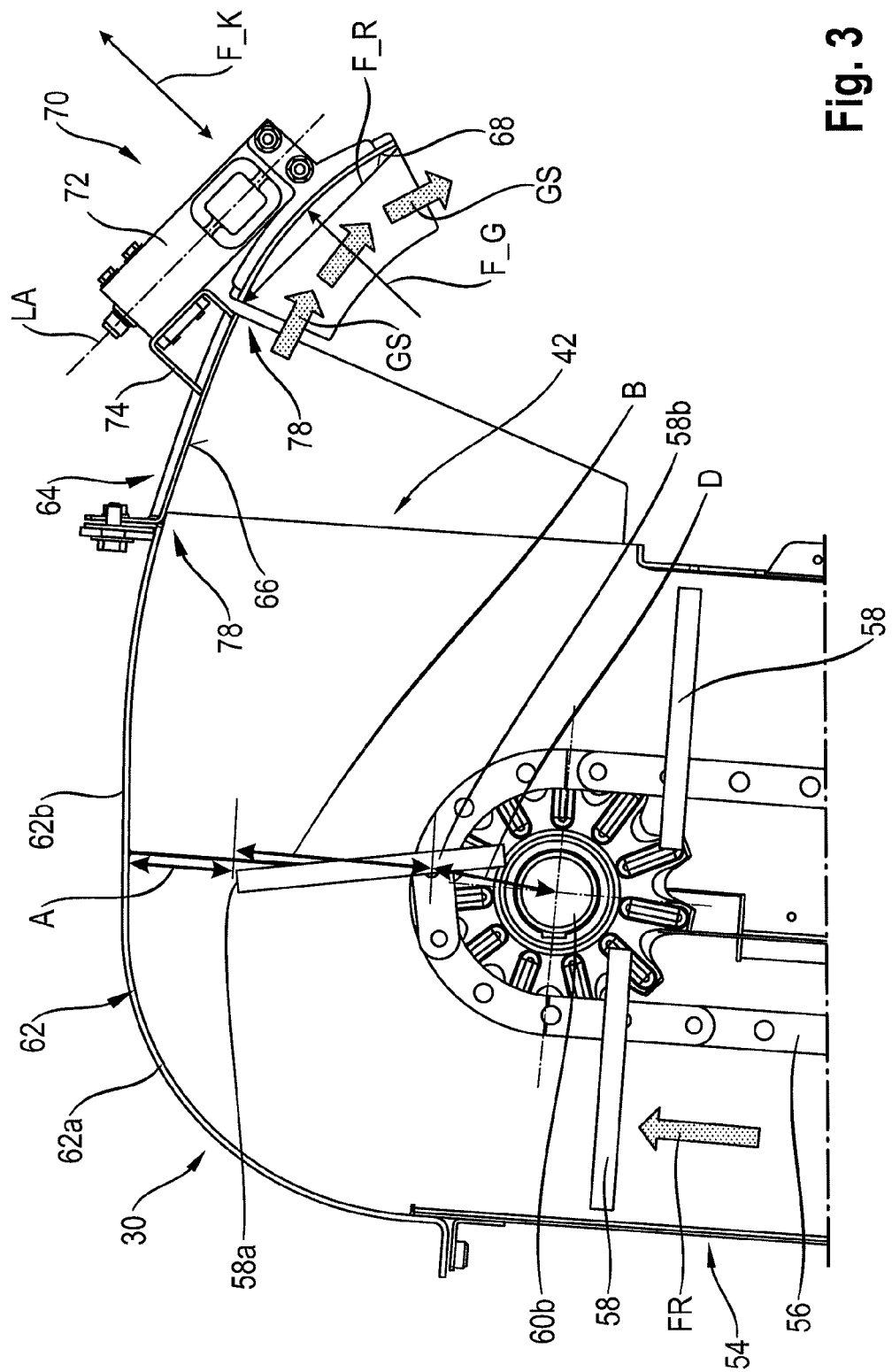
FIG. 3 shows a simplified partial view of the conveyor according to FIG. 2.

The illustration in FIG. 3 shows the upper region of the conveyor 30 according to FIG. 2 in a further simplified depiction. The components of the conveyor 30 located below the upper chain wheel 60b as well as the grain auger 76 disposed in the bulk material delivery area 42 are not included in the illustration for purposes of simplification. The illustration shows a conveyor element 58, the free end 58a of which is in the zenith of the upper chain wheel 60b. In this position of the conveyor element 58, referred to as the zenith, the spacing between the free end 58a and the cover section 62 partially encompassing the conveyor 30 in the bulk material delivery area 42 is at a minimum. When the respective conveyor element 58 reaches this position, it is to be ensured that the harvest located on the conveyor element 58 has been nearly entirely delivered. For this, the spacing between the free end 58a of the respective conveyor element 58 and the cover section 62 encompassing the conveyor 30 in the bulk material delivery area 42 when the conveyor element 58 is in the position in which the spacing to the cover section 62 is at a minimum, is selected such that bulk material located on the conveyor element 58 can be delivered almost entirely, and can flow against the sensor surface 68 in a uniform manner. For this, the cover section 62 and the free end 58a of the respective conveyor element 58 located in the zenith exhibit a minimum spacing A. The minimum spacing A is equal to or smaller than a spacing B between the free end 58a of the conveyor element 58 and a pivot point 58b on the continuous, circulating conveyor chain 56 of the conveyor 30. The spacing B corresponds thereby to one half of the spacing of the free end 58a of the conveyor element 58 to the pitch diameter D of the upper chain wheel 60b. In order to keep the minimum spacing A constant, it is provided that a tension device for tensioning the conveyor chain is disposed in the lower region of the conveyor 30.

Furthermore, the design of the measuring device 70 can be derived from the illustration in FIG. 3. The measuring device 70 is disposed on the guide section 64 by a housing enclosing the load cell 72 on the mount 74. The sensor surface 68 is connected to the conveyor 30 only by the load cell 72. In this manner, disruptions through hysteresis of a potential bearing are eliminated. The transitions 78 between the second section 62b of the cover section 62 and the guide section 64, as well as the guide section 64 to the sensor surface 68 of the measuring device 70 have a tangential course, as explained above. The respective tangential courses of the transitions 78 ensure a tangential incidence of the harvest flow at the sensor surface 68.

The load cell 72 is designed as a platform weighing cell. This type of load cell 72 measures the forces acting on the sensor surface 68 independently of a lever resulting from the spacing between the attachment of the mount 74 and the arrangement of the sensor surface on the load cell 72. The harvest flowing along the sensor surface 68 generates a centrifugal force subject to tilt and gravitational effects, resulting from its redirection, which is illustrated by a force vector F_G. The load cell 72 is disposed such that the measurement direction of the measuring device 70 and the resulting centrifugal force F_G acting on the sensor surface 68 are oriented in the same direction. The load cell 72 records a measured force illustrated by a resulting force vector F_K. The orientation of the force vector F_K also represents the measurement direction of the load cell 72. The frictional forces of the passing harvest flow resulting from the friction occurring on the surface of the sensor surface 68 are illustrated by a force vector F_R. The course of the force vector F_R of the resulting frictional forces is parallel to the longitudinal axis LA of the load cell 72, or perpendicular to the measurement direction of the load cell 72, such that the resulting frictional forces are not included in the force measurement for determining the throughput. This results in an arrangement of the sensor surface 68 that compensates for frictional forces. In this way, the term "compensate," or variations thereof, refers to providing a counterbalance to, offsetting, or neutralizing the effect of, a certain parameter.

A method for determining the mass flow including cleansed harvest that is conveyed by the conveyor 30 into the grain tank 32 is described below. As explained above, the cleansed harvest delivered by the conveyor 30 from the guide surface 66 of the guide section 64 provided in the bulk material delivery area 42 is deflected toward the sensor surface 68 of the measuring device 70. The mass of the harvest flow is determined by the measurement of the resulting centrifugal force (force vector F_G) exerted on the sensor surface 68 of the measuring device 70, wherein at least two parameters that have an effect on this force measurement are compensated for. Primarily, due to the special arrangement of the load cell 72, the resulting frictional forces (force vector F_R) applied to the sensor surface 68 by the harvest flow are compensated for.

Moreover, it is provided that at least one second parameter having an effect on the force measurement is compensated for. Among others, external mechanical forces acting substantially vertically on the conveyor 30, a rotational rate decrease with respect to a decrease in the conveyance speed of the conveyor 30, and a tilting of the measuring device 70 are to be regarded as parameters that have an effect on the force measurement. Fundamentally, the harvest, as well as properties such as the moisture content of the harvest, are to be taken into account. Depending on the harvest, the weight and size of the individual particles of the cleansed harvest have an effect on the flow behavior, as well as on the resulting centrifugal force F_G exerted on the sensor surface 68. The moisture content of the harvest can have an effect on the speed with which the harvest flows from the respective conveyor element 58 along the guide section 64 and along the sensor surface 68. Furthermore, the moisture content can have an effect on the adhesive behavior of the harvest.

In order to take these effects into account when determining the mass flow on the basis of the force measurement by the measuring device 70, the control and regulating device 52 is connected in a signal transmitting manner to the sensors 44, 46, 48. The respective sensor 44, 46, 48 issues a signal representing the respective measurement that is to be monitored, which is received by the control and regulating device 52, and evaluated and taken into account with respect to its influence on the resulting force F_K measured by means of the load cell 72.

Thus, a temporary reduction, i.e. a decrease in the rotational rate, of the engine 34 can be detected by means of the rotational rate sensor 46. The temporary rotational rate reduction of the engine 34 results in a rotational rate reduction, or a reduction in the conveyance speed, respectively, of the conveyor 30. The resulting speed reduction of the harvest flow flowing along the sensor surface 68, indicating a reduction of the throughput, is offset accordingly by the control and regulating device 52. In this manner, the resulting centrifugal force F_G applied to the sensor surface 68 by the harvest flow is determined taking into account the speed reduction during the force measurement by the measuring device 70 for determining the throughput.

Another parameter that has an effect on the determination of the mass flow on the basis of the force measurement by the measuring device 70 is the moisture content of the harvest. The moisture content of the harvest during the harvesting varies, depending on the harvest time and the external environmental conditions, such as weather. With an increase in the moisture content, the overall weight of a grain can increase. The important thing is the effect on the speed with which the harvest flows after being thrown from the respective conveyor element 58, as well as the effects of friction. Accordingly, the resulting forces exerted on the sensor surface 68 by the harvest passing over it, the resulting centrifugal force F_G and the resulting frictional force, may change even though the throughput remains constant. In order to compensate for these effects, the detection characteristic of the measuring device 70 is modified as a function of the moisture content of the harvest. A moisture sensor 44 can be disposed in the combine harvester 10, as described above, in order to determine the moisture content of the cleansed harvest. This moisture sensor 44 is preferably disposed in the region of the bulk material receiving area 40. Alternatively, a manual determination of the moisture content of the harvest can be carried out at the start of the harvesting. The results of this manual moisture content determination can be transmitted to the control and regulating device 52 by means of an input/output device 80, in order to adjust the detection characteristic of the measuring device 70 accordingly.

During the harvesting by the combine harvester 10, a longitudinal or transverse tilting of the combine harvester 10 may take place, or the driving dynamics may be subjected to an acceleration change, due to the conditions of the ground that is to be processed. The load cell 72 only measures the resulting centrifugal force F_G acting on the sensor surface 68 to its full extent, however, when it acts precisely in the measurement direction of the load cell 72. If the angle of the load cell 72 changes with respect to the combine harvester 10, then the gravitational force acts on the sensor surface 68 and on the harvest flow at a different angle. The change to the resulting centrifugal force F_G and the resulting force F_K measured by the load cell 72 under the influence of the tilt of the combine harvester 10 are offset accordingly, and thus compensated for by the force measurement in the determination of the throughput, or yield. This compensation can take place internally, in the measuring device 70. Alternatively, a tilt sensor 50 is disposed on or in the combine harvester 10. The signals received from the tilt sensor 50, representing a longitudinal or transverse tilting, are transmitted to the control and regulating device 52, and evaluated. The control and regulating device 52 compensates for the effects of the tilting on the determination of the throughput via these tilt values.

Furthermore, external mechanical forces acting on the conveyor 30 in a substantially vertical direction have an effect on the determination of the throughput. In this case, these are accelerating forces, which occur when driving on the field, or as a result of the drives 34 of the combine harvester 10. In the latter case, these are oscillations transferred to the body of the vehicle by the drive and the drive elements of the combine harvester, which are also introduced into the conveyor 30. These forces also act on the measuring device 70, such that deviations arise in the resulting forces F_K measured by the load cell 72 at the point in time when the acceleration takes place. Thus, driving through a depression in the ground may lead to an abrupt acceleration in a substantially vertical direction, having an effect on the measurement of the resulting centrifugal force F_G exerted by the harvest as it flows over the sensor surface 68. This additional force caused by the acceleration is likewise compensated for. This compensation can also take place thereby internally, in the measuring device 70. Alternatively, an acceleration sensor 48 is disposed in or on the combine harvester 10. Its signals are likewise received and evaluated by the control and regulating device 52, in order to be able to compensate for the effect of the acceleration on the force measurement.

Appropriate algorithms or detection characteristics, which can be oriented on the type of harvest or the type of harvester, are stored in a retrievable manner in a memory unit of the control and regulating device 52 in order to be able to compensate for these effect variables.

Figure 4:
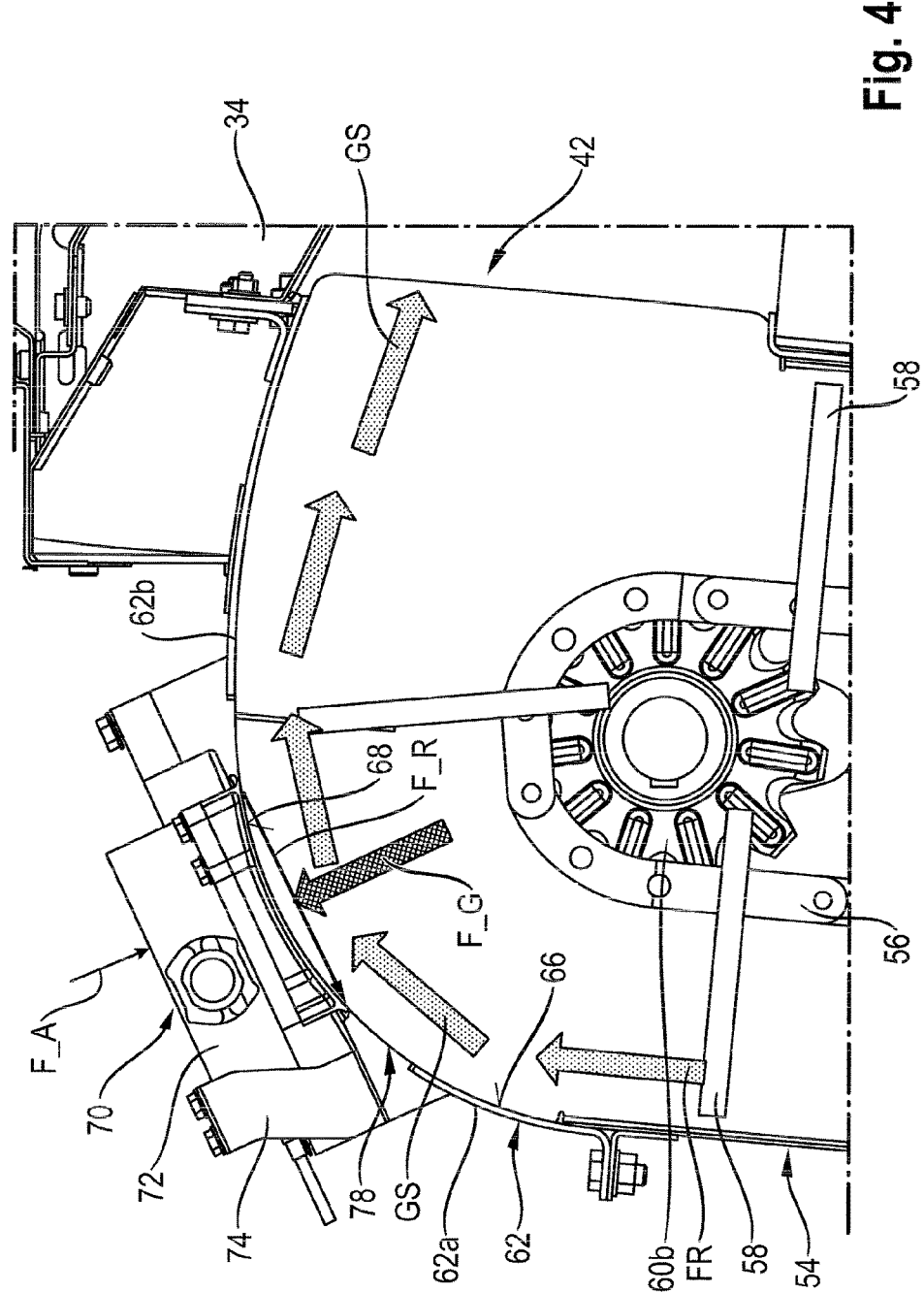
FIG. 4 shows a partial view of an alternative design of a measuring device in the upper region of the conveyor.

An alternative design of the measuring device 70 is illustrated in FIG. 4. According to this embodiment, the sensor surface 68 is located in the first section 62a of the cover section 62. The guide surface 66 is part of the first section 62 of the cover section 62 thereby. Because it is disposed in the first section 62a, the measuring device 70, i.e. the load cell 72 and the sensor surface 68, is located outside the grain tank 32. According to this embodiment, the guide surface 66 is located in the upper intake area of the conveyor 30, i.e. prior to the redirection point of the conveyor elements 58. The advantage with this arrangement, or positioning, of the sensor surface 68 is that the harvest is subjected to a strong deflection due to the stronger curvature of the sensor surface 68. Large forces thus act on the sensor surface 68, such that even low harvest throughputs can be effectively measured. Moreover, due to the small spacing between the free ends 58a of the conveyor elements 58 and the sensor surface 68, the harvest is actively conveyed in this region. This leads to a lower frictional effect in the measurement of the mass flow. Furthermore, the active conveyance of the harvest ensures a continuous harvest flow, which is subjected to the effects of gravity to a lesser extent.

This arrangement of the measuring device 70 outside the grain tank 32 requires a measure for preventing harvest losses through discharge into a region between the cover section 62 and the measuring device 68.

One possible measure is to provide a circumferential seal on the sensor surface 68 with respect to the first section 62a, in order to prevent harvest losses. It is also conceivable to maintain a gap between the sensor surface 68 and the first section 62a that is so small that it is impossible for harvest to pass through it. An alternative measure could also be the collecting of harvest passing through the gap between the sensor surface 68 and the first section 62a by a device provided for this, and the returning of said harvest into the conveyor.

In order to ensure the throughput measurement, despite the circumferential seal connecting the sensor surface 68 to the first section 62a of the cover section 62, the material used for the seal is elastic. The elastic material of the seal allows for a slight displacement of the sensor surface 68 in the measurement direction of the load cell 72, caused by the resulting centrifugal force F_G. The centrifugal force F_G transferred by the harvest flow to the sensor surface 68 is measured through the deflection of the sensor surface 68 in the measuring device in relation to the first section 62a. It should be taken into account here that the material used for the circumferential seal exerts a resulting return force F_A that is counter to the resulting centrifugal force F_G. This resulting return force F_A is compensated for accordingly with the knowledge of the material specific characteristics of the seal as well as the geometric factors of the arrangement of the load cell 72. A further aspect of this embodiment is the production of the cover section 62 from a plastic.

LIST OF REFERENCE SYMBOLS

- 10 combine harvester
- 12 harvest
- 14 working assembly
- 16 cutting unit
- 18 grain conveyor
- 20 thresher
- 22 impeller
- 24 separator
- 26 return pan
- 28 cleansing device
- 30 conveyor
- 32 grain tank
- 34 engine
- 40 bulk material receiving area
- 42 bulk material delivery area
- 44 moisture sensor
- 46 rotational rate sensor
- 48 acceleration sensor
- 50 tilt sensor
- 52 control and regulating device
- 54 housing
- 56 conveyor chain
- 58 conveyor element
- 58a free end of 58
- 60a lower chain wheel
- 60b upper chain wheel
- 62 cover section
- 62a first section of 62
- 62b second section of 62
- 64 guide section
- 66 guide surface
- 68 sensor surface
- 70 measuring device
- 72 load cell
- 74 mount
- 76 grain auger
- 78 tangential transition
- 80 input/output device
- A minimum spacing
- B spacing
- D pitch diameter of 60b
- FR conveyance direction GS flow course
F_G force vector centrifugal force
F_R force vector frictional force
F_K force vector acceleration
F_A force vector return force

The invention claimed is:

1. A method for determining a mass flow composed of bulk material comprising:
   conveying the bulk material with a continuous, circulating conveyor, having planar conveyor elements, from a lower bulk material receiving area to a higher bulk material delivery area;
   deflecting the bulk material delivered by the conveyor with a guide surface disposed in the higher bulk material delivery area toward a measuring device, wherein the measuring device comprises a platform weighing cell;
   determining the mass flow by measuring a resulting force ($F\_G$) exerted on a sensor surface of the measuring device; and
   compensating for changes in tilt,
   wherein a guide section has the guide surface;
   wherein the measuring device comprises a mount;
   wherein the platform weighing cell is attached to the mount;
   wherein the mount is attached to the guide surface; and
   wherein the platform weighing cell measures at least one force acting on the sensor surface independent of a lever resulting from spacing between an attachment of the mount to the guide surface and arrangement of the sensor surface on the platform weighing cell.

2. The method according to claim 1, wherein the compensating comprises mechanical compensating by configuring the measuring device such that the frictional forces transferred from the bulk material to the sensor surface remain in a direction perpendicular to a measurement direction of the measuring device.

3. The method according to claim 2, wherein external mechanical forces acting on the conveyor in a substantially vertical direction are compensated.

4. The method according to claim 2, further comprising compensating for a reduction in rotational rate of the conveyor.

5. The method according to claim 1, further comprising calibrating the measuring device by carrying out a plurality of weighings, and determining a correction factor from results of the weighings.

6. The method according to claim 1, wherein determining the mass flow further comprises taking into account a type and nature of the bulk material.

7. The method according to claim 6, further comprising adjusting a measurement characteristics of the measuring device as a function of the type of bulk material and bulk material physical properties.

8. The method according to claim 1, wherein determining the mass flow is executed independently of a density of the bulk material.

9. The method according to claim 1, wherein the sensor surface is connected to the conveyor only by the platform weighing cell.

10. The method according to claim 1, wherein mechanically compensating is performed internally to the measuring device.

11. A combine harvester comprising:
    a continuous circulating conveyor having planar conveyor elements and configured to convey bulk material from a lower bulk material receiving area to a higher bulk material delivery area;
    a guide section having a guide surface disposed in the higher bulk material delivery area toward a measuring device and configured to deflect the bulk material delivered by the conveyor; and
    the measuring device comprising a platform weighing cell and including a sensor surface and configured to compensate for changes in tilt,
    wherein the measuring device comprises a mount;
    wherein the platform weighing cell is attached to the mount;
    wherein the mount is attached to the guide surface; and
    wherein the platform weighing cell is configured to measure at least one force acting on the sensor surface independent of a lever resulting from spacing between an attachment of the mount to the guide surface and arrangement of the sensor surface on the platform weighing cell.

12. The combine harvester of claim 11, wherein the measuring device is configured to mechanically compensate such that the frictional forces transferred from the bulk material to the sensor surface remain in a direction perpendicular to a measurement direction of the measuring device.

13. The combine harvester of claim 11, wherein the sensor surface is connected to the conveyor only by the platform weighing cell.

14. The combine harvester of claim 11, further comprising:
    a moisture sensor positioned apart from the sensor surface of the measuring device and configured to generate an indication of moisture content of the bulk material; and
    a controller configured to compensate, using the indication of the moisture content of the bulk material for an effect on a force measurement when determining mass flow of the bulk material.

15. The combine harvester according to claim 14, wherein the moisture sensor is positioned in a region of the lower bulk material receiving area.

* * * * *